(12) United States Patent
D'Araujo et al.

(10) Patent No.: US 12,203,315 B2
(45) Date of Patent: Jan. 21, 2025

(54) METHOD FOR OPENING A DOOR OF A MOTOR VEHICLE BY MOVEMENT DETECTION, USING A DOPPLER RADAR AND ASSOCIATED DETECTION DEVICE

(71) Applicant: VITESCO TECHNOLOGIES GmbH, Regensburg (DE)

(72) Inventors: Franck D'Araujo, Toulouse (FR); Wladia Waszak, Toulouse (FR); Hervé Richard, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 262 days.

(21) Appl. No.: 17/625,577

(22) PCT Filed: Jul. 10, 2020

(86) PCT No.: PCT/EP2020/069515
§ 371 (c)(1),
(2) Date: Jan. 7, 2022

(87) PCT Pub. No.: WO2021/009028
PCT Pub. Date: Jan. 21, 2021

(65) Prior Publication Data
US 2022/0282553 A1     Sep. 8, 2022

Related U.S. Application Data

(60) Provisional application No. 62/875,198, filed on Jul. 17, 2019.

(30) Foreign Application Priority Data

Sep. 26, 2019 (FR) ..................... 1910646

(51) Int. Cl.
*E05B 81/56* (2014.01)
*B60R 25/01* (2013.01)
(Continued)

(52) U.S. Cl.
CPC .............. *E05F 15/73* (2015.01); *E05B 81/56* (2013.01); *E05B 81/64* (2013.01); *G01S 13/56* (2013.01);
(Continued)

(58) Field of Classification Search
CPC .... E05F 15/73; E05F 2015/763; E05B 81/56; E05B 81/64; G01S 13/56; G01S 13/87;
(Continued)

(56) References Cited

U.S. PATENT DOCUMENTS

2018/0170309 A1   6/2018   McMahon et al.
2019/0079026 A1   3/2019   Statnikov
(Continued)

FOREIGN PATENT DOCUMENTS

CN   109490870 A        3/2019
DE       10234291 B4 *  2/2004   ........... G01S 13/348
(Continued)

OTHER PUBLICATIONS

Machine Translation DE 10234291 (Year:2004).*
(Continued)

*Primary Examiner* — Anne Marie Antonucci
*Assistant Examiner* — Kirsten Jade M Santos
(74) *Attorney, Agent, or Firm* — NIXON & VANDERHYE

(57) ABSTRACT

Disclosed is a method for opening a door of a motor vehicle equipped with a device with two Doppler radars for detecting a predetermined movement of a part of the body of a user, the method including: for each radar, comparing the characteristic parameter with a predetermined shape including a predetermined number of peaks a characteristic value of which is higher than a predetermined persistence threshold; if the characteristic parameter has, for the first and second radars, the predetermined shape in a given interval of
(Continued)

interest, and if, in the interval of interest, the first radar also sees a predetermined number of changes of phase between the in-phase component and the phase-offset component, then, the predetermined movement is detected and the door is opened, the door otherwise not being opened.

20 Claims, 6 Drawing Sheets

(51) Int. Cl.
  *B60R 25/31* (2013.01)
  *E05B 81/64* (2014.01)
  *E05F 15/73* (2015.01)
  *G01S 13/56* (2006.01)
  *G01S 13/87* (2006.01)
  *G01S 13/931* (2020.01)

(52) U.S. Cl.
  CPC ............... *G01S 13/87* (2013.01); *B60R 25/01* (2013.01); *B60R 25/31* (2013.01); *E05Y 2400/44* (2013.01); *E05Y 2400/45* (2013.01); *E05Y 2400/858* (2013.01); *E05Y 2900/536* (2013.01); *E05Y 2900/548* (2013.01); *G01S 2013/93272* (2020.01); *G01S 2013/93275* (2020.01)

(58) Field of Classification Search
  CPC . G01S 2013/93272; G01S 2013/93275; G01S 13/931; G01S 13/583; G01S 13/88; G01S 7/352; G01S 7/415; G01S 13/536; G01S 13/62; B60R 25/01; B60R 25/31; B60R 5/04; E05Y 2400/44; E05Y 2400/45; E05Y 2400/858; E05Y 2900/536; E05Y 2900/548
  See application file for complete search history.

(56) References Cited

U.S. PATENT DOCUMENTS

2019/0128040 A1* 5/2019 Scott ........................ E05F 15/40
2019/0162010 A1* 5/2019 Wassim .................... B60J 5/101

FOREIGN PATENT DOCUMENTS

| DE | 102012014482 | 5/2014 |
|---|---|---|
| EP | 2 159 362 | 3/2010 |

OTHER PUBLICATIONS

International Search Report for PCT/EP2020/069515, mailed Sep. 25, 2020, 4 pages.
Written Opinion of the ISA for PCT/EP2020/069515, mailed Sep. 25, 2020, 6 pages.
Office Action and Search Report, issued in Chinese Patent Application No. 202080051308.2 dated Jul. 4, 2024.
Yi et al., "Human Gait Parameter Estimation Based on micro-Doppler Feature", Signal Processing, vol. 26, No. 6, Jun. 2010, pp. 917-922.

* cited by examiner

[Fig. 1]
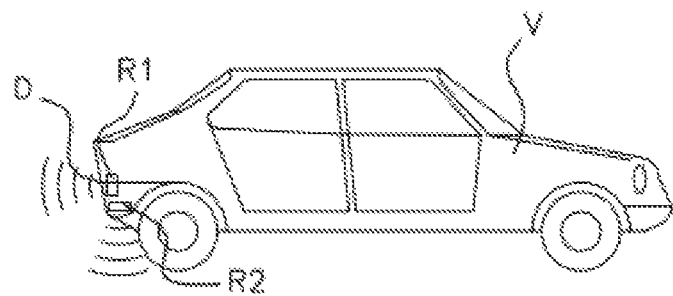
[Fig. 2]
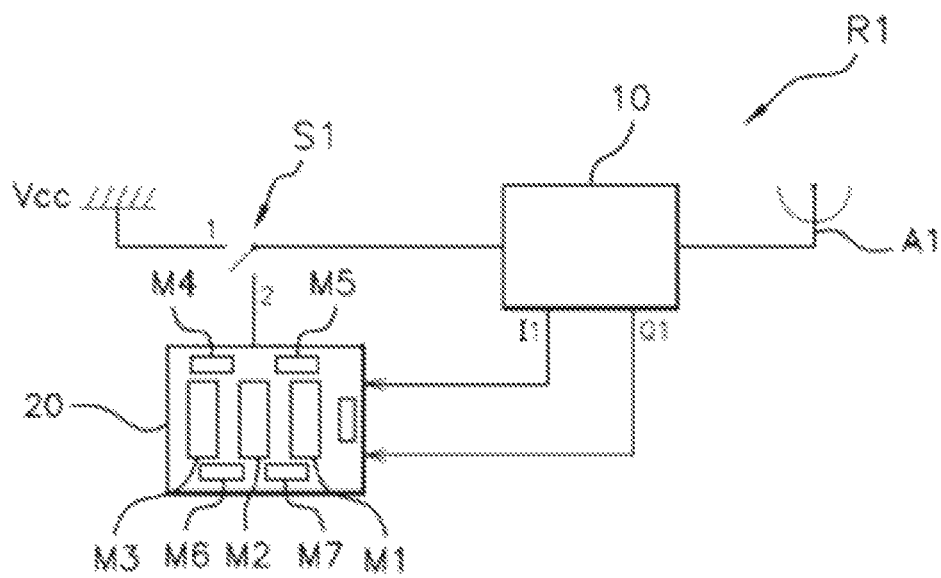

[Fig. 3]
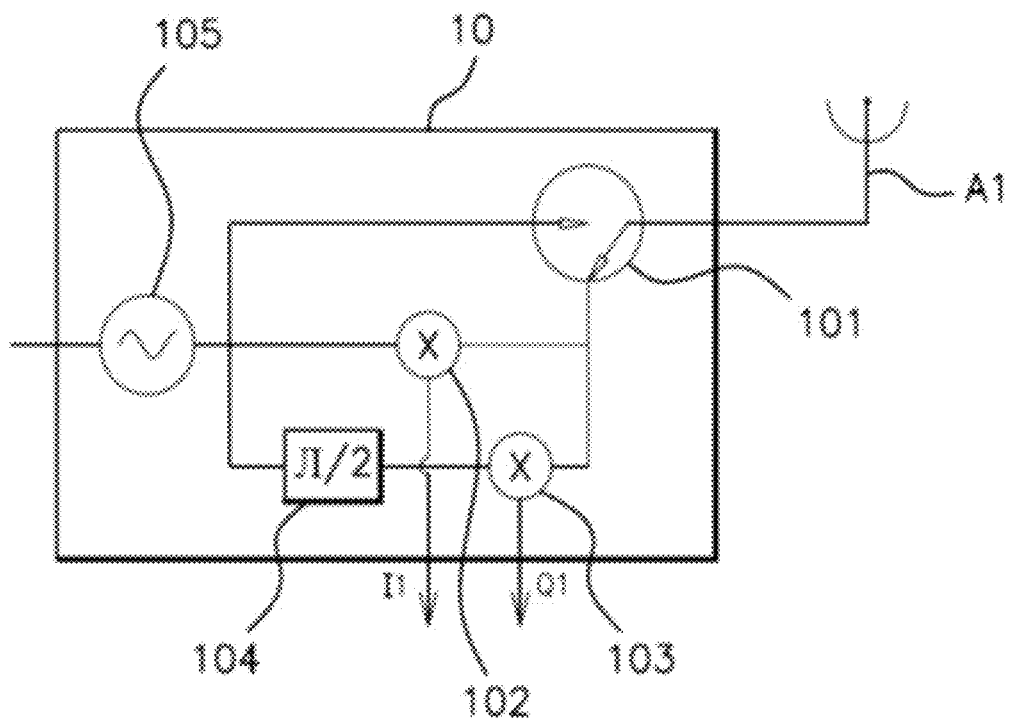
[Fig. 4]
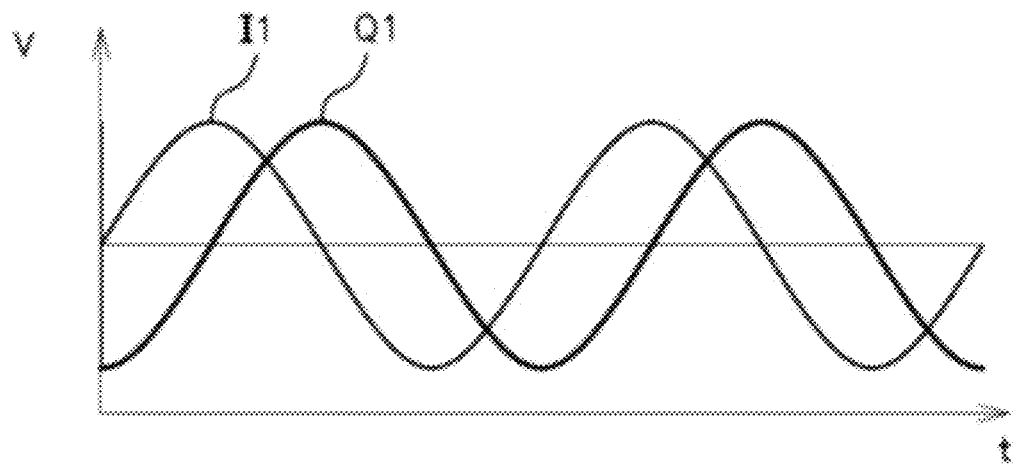

[Fig. 5]
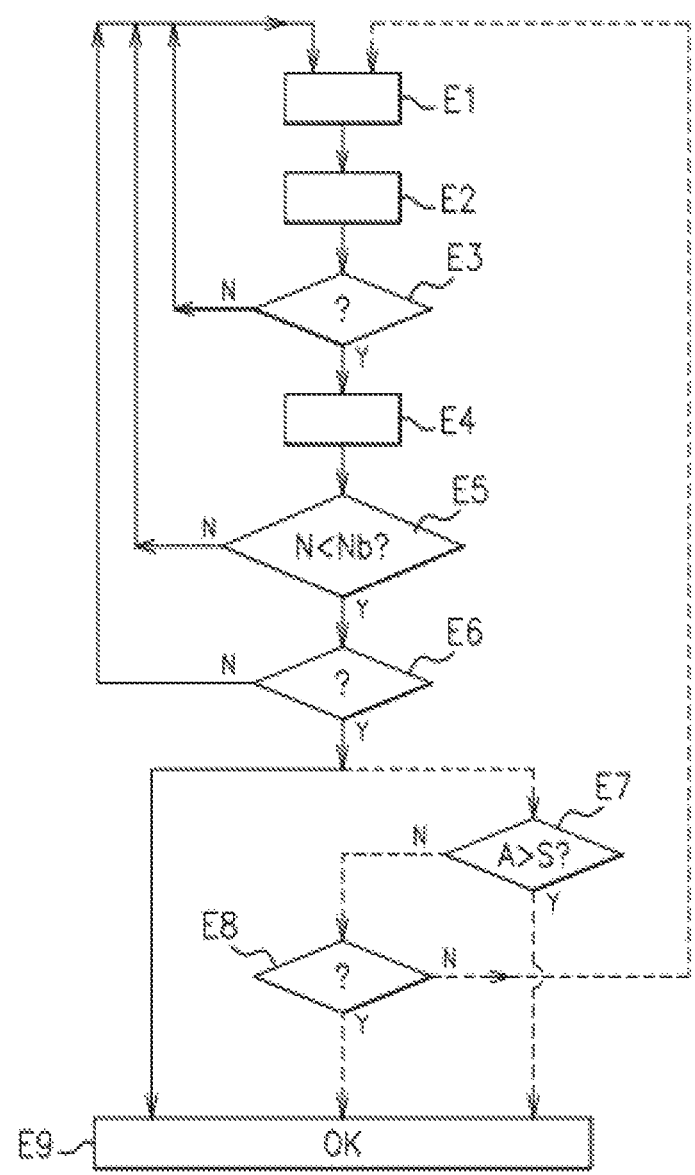

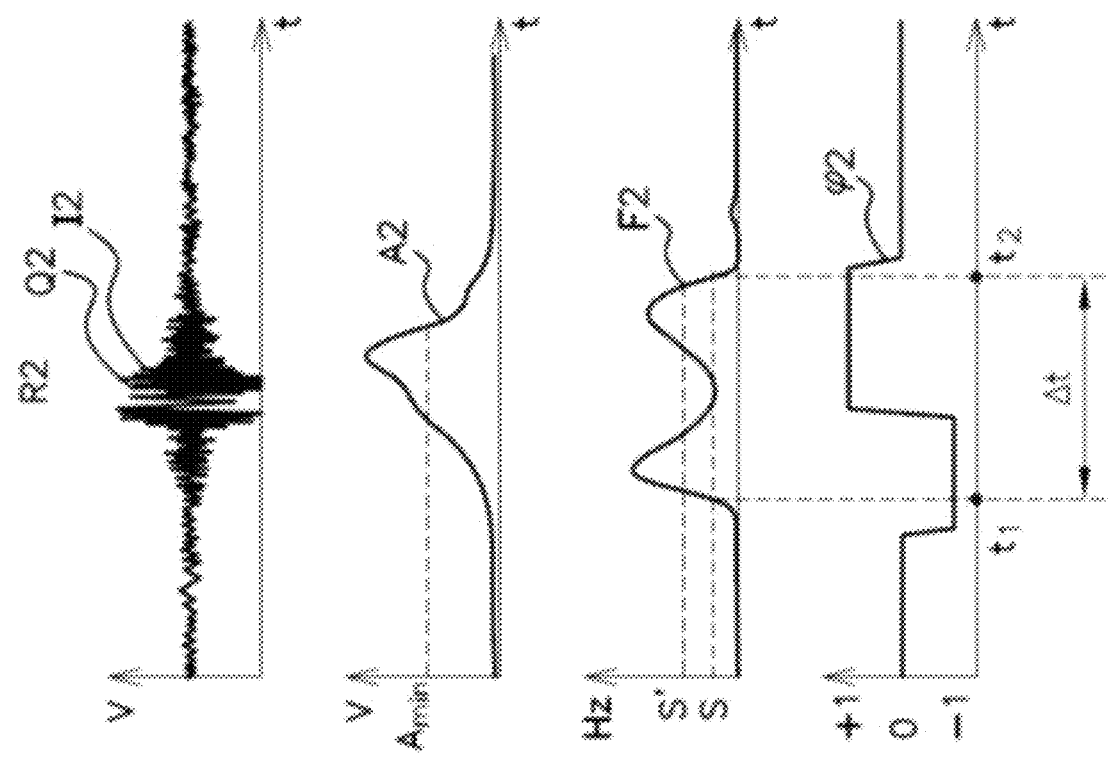
[Fig. 6]

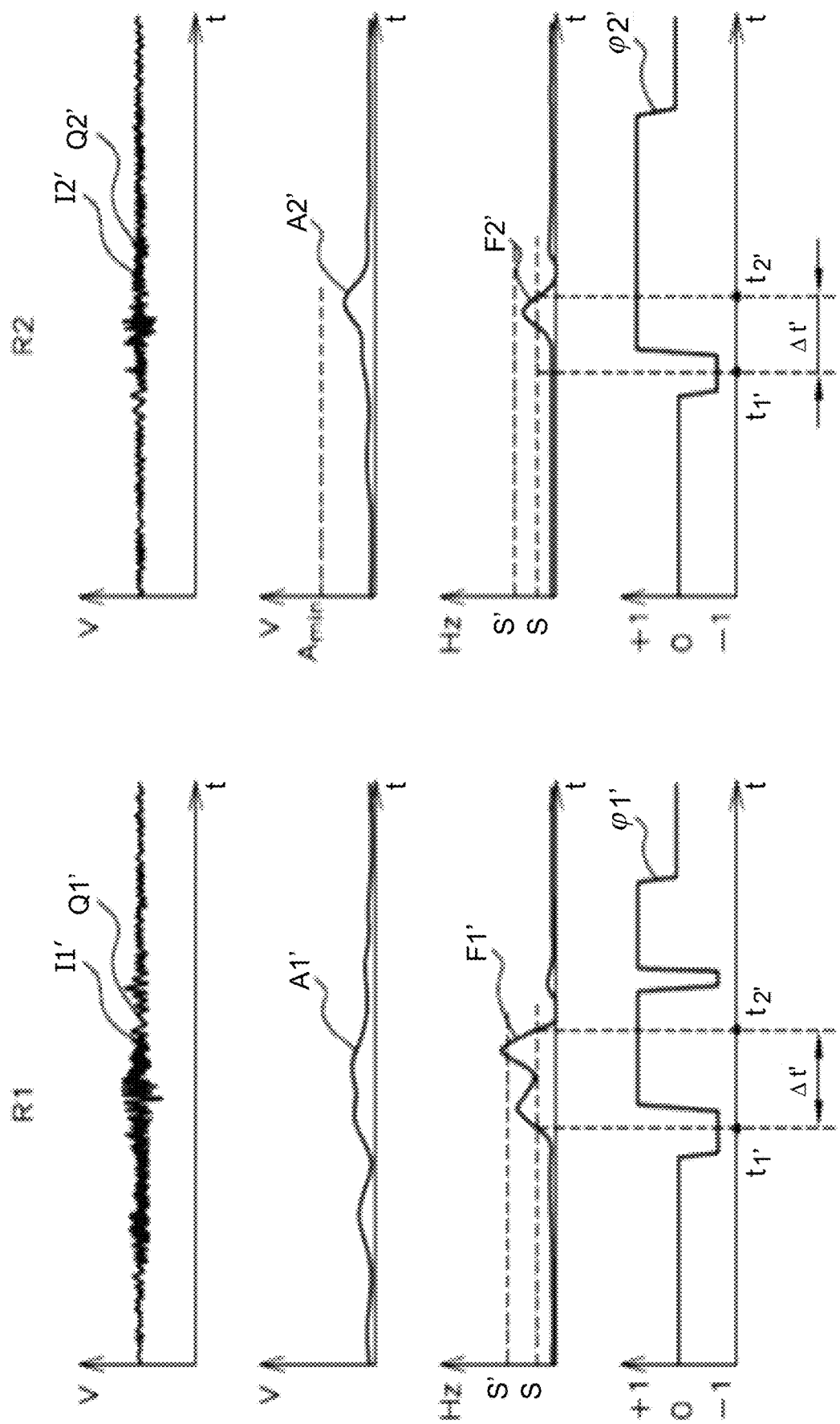

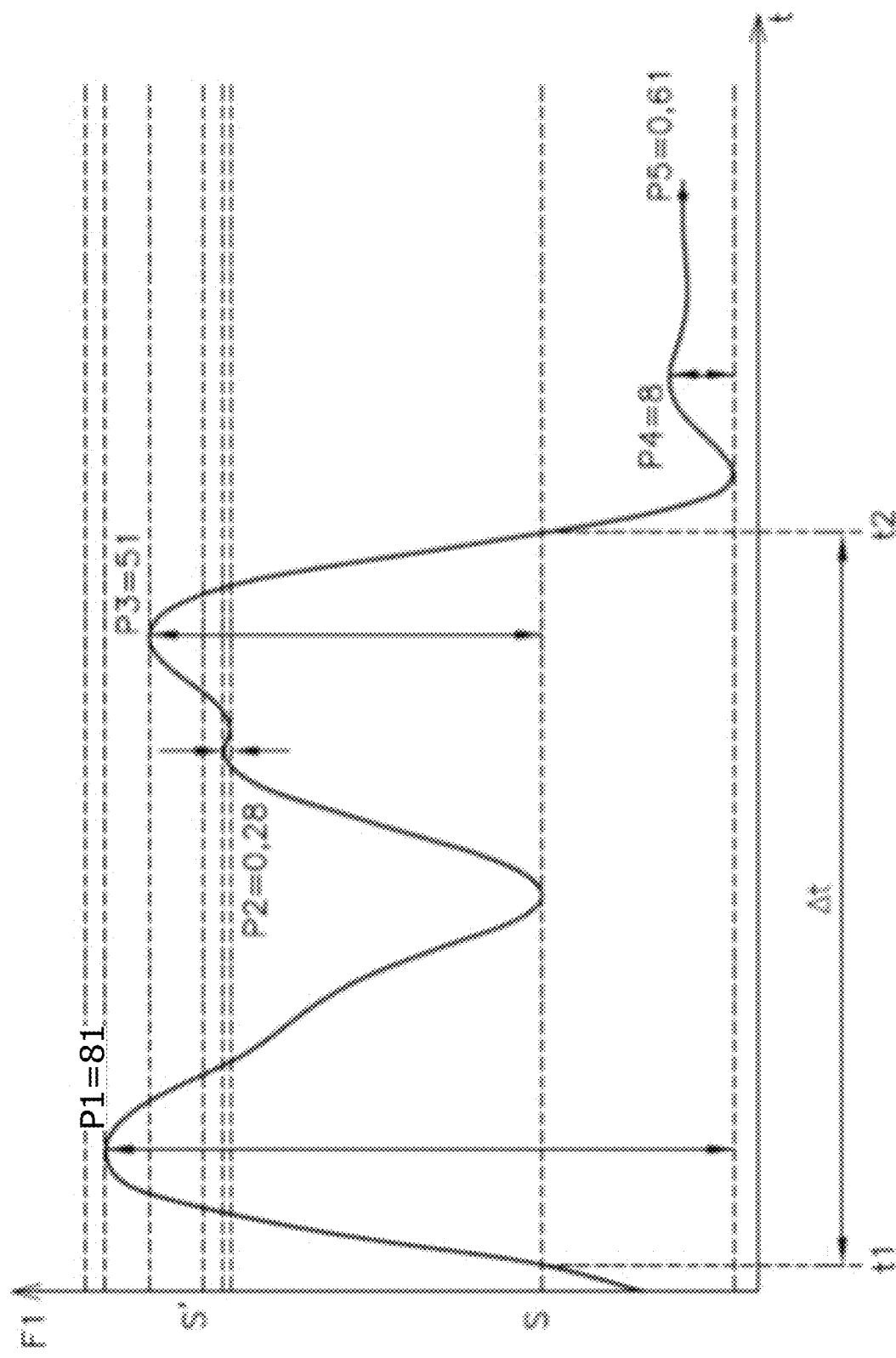
[Fig. 8]

METHOD FOR OPENING A DOOR OF A MOTOR VEHICLE BY MOVEMENT DETECTION, USING A DOPPLER RADAR AND ASSOCIATED DETECTION DEVICE

This application is the U.S. national phase of International Application No. PCT/EP2020/069515 filed 10 Jul. 2020, which designated the U.S. and claims priority to FR Patent Application No. 1910646 filed 26 Sep. 2019, and claims the benefit of U.S. Application No. 62/875,198 filed 17 Jul. 2019, the entire contents of each of which are hereby incorporated by reference.

BACKGROUND OF THE INVENTION

Field of the Invention

The invention relates to a method for opening/closing a door via detection of movement of a user's lower limb, using a Doppler radar, and allowing secure hands-free access. In the context of the invention, the term "door" is understood to mean a door as such, hood, or trunk lid of a motor vehicle.

Description of the Related Art

The main but not exclusive application of this invention is to opening vehicle trunks, in order to allow the authorized user to open a trunk solely with a foot movement, the user being identified, via a fob or a key that he is carrying, by a body control module (BCM) located in the vehicle.

Until now, hands-free access requests have mainly required a hand to be placed to confirm a request to open/close the door of a vehicle, this process comprising two main steps: recognition of a key or a fob authorized to open or close the vehicle in proximity to the door by the BCM of the access system; and, in case of a request to open, detection of the presence of a hand on a handle.

Implementation of this method requires antennas for detecting authorized keys or fobs; presence sensors, generally capacitive sensors, in the handles for hand detection; and a centralized system for managing hands-free access requests, which may for example be a computer entirely or partially dedicated to this function.

With respect to the use of a foot for contactless opening, one known application regards hospital staff opening the door of an operating room. The utility model CN 202 143 044 proposes, for example, to equip the door with an induction sensor for foot detection. People wishing to enter or exit the room place their foot near the sensor and the signal detected by the sensor is transmitted to a device for controlling an opening/closing mechanism of the door.

A use of a foot for hands-free access to the trunk of an automobile is provided for in international application WO 2012/052210. This document proposes to detect movement of a part of the body of the user, one of his feet for example, using a capacitive detecting assembly comprising two elongate electrodes. These electrodes extend horizontally under the trunk, the longest under the shortest, and are coupled to a control and evaluation device. Variations in capacitance are tracked with respect to a reference potential, and an actuation is triggered, for example opening the trunk, when the movement is within the detection interval.

However, the use of capacitive sensors has certain major drawbacks. In the present use case, capacitive sensors are sensitive to exterior perturbations (rain, snow, etc.). Management of opening of the doors of a vehicle in the context of hands-free access requests employing hand detection has been improved to combat various perturbations. For example, patent document FR 2 827 064 aims to identify perturbations generated by the metallic paints of automobiles, by interpreting the durations of the received signals using a logic module.

One solution to the problem of electromagnetic perturbations is described in patent document FR 2 915 331. It is proposed to carry out time-domain filtering of the signals generated by the sensors of the handles of the doors, in order to validate whether a hand is present (or not) on a handle before validating a request to open.

Current prior-art hands-free opening/closing systems therefore provide an appreciable level of comfort to their users, confirmation of whether or not a given door is to be opened/closed being given via the presence of a hand or via a movement of a foot. However, false detections, such as those resulting from perturbations caused by atmospheric effects, rain in particular, or effects of other types (electromagnetic perturbations, objects rolling under the bumper, etc.), are not identified as such, and unexpectedly trigger a false request to open. Ways of mitigating certain perturbations in hand-confirmed opening/closing systems do exist, but no reliable solution exists for systems for detecting foot movements. Even if, in the latter case, the detecting system is based on two sensors per door, the system is not reliable enough in a noisy environment.

It is therefore known to use a Doppler radar instead of capacitive sensors. A predetermined movement of a lower limb of the body of a user is detected by transmitting radar waves that are directed toward behind the vehicle (the radar may, for example, be located in the rear bumper of the vehicle) and by analyzing the waves reflected by the presence of the user. The analysis of the reflected waves allows the dynamics of the movement to be determined: distance of the user from the radar, speed and shape of the movement. Detection of the predetermined movement triggers opening of the trunk.

However, one major drawback of the prior-art Doppler radar is the accuracy, reliability and robustness of the detection of the predetermined movement. In the present use case, detection by a Doppler radar is unreliable when the user makes a forth-and-back movement with his leg in the direction of the bumper such that his foot slides during the movement over the ground. Detection by Doppler radar also does not allow a predetermined movement to be robustly distinguished from a movement of a lower leg of a user passing near to the vehicle, or moving back and forth close to the vehicle but not wishing to open its trunk.

The present invention therefore provides a method for opening a door, using, in an optimized manner, two Doppler radars allowing the drawbacks of the prior art to be mitigated. The method according to the invention for opening, in the present use case, a door allows the predetermined movement to be detected, in a reliable and robust manner.

SUMMARY OF THE INVENTION

The invention proposes a method for opening a door of a motor vehicle, the vehicle being equipped with a device for detecting a predetermined movement of a part of the body of a user, the method being noteworthy in that it comprises the following steps:

the device is equipped beforehand with two Doppler radars, a first radar being able to emit waves oriented toward behind the vehicle, and a second radar being able to emit waves oriented toward the ground, each radar comprising an antenna, means for transmitting and receiving radar waves, and means for processing the reflected radar waves and able to detect the predetermined movement;

at set frequency, for each radar, an in-phase component and a phase-offset component of the reflected waves are measured;

a characteristic parameter of at least one of the two components is determined for each radar;

for each radar, the characteristic parameter is compared with a predetermined shape comprising a predetermined number of peaks a characteristic value of which is higher than a predetermined persistence threshold;

if the characteristic parameter has, for the first and second radar, the predetermined shape in a given interval of interest, and if, in said interval of interest, the first radar also sees a predetermined number of changes of phase between the in-phase component and the phase-offset component, then, the predetermined movement is detected and the door is opened, the door otherwise not being opened.

In a second embodiment, if the first radar sees the predetermined number of changes of phase between the in-phase component and the phase-offset component, the method comprises an additional step as follows:

comparing, in said interval of interest, an amplitude of one of the two components of the second radar with a minimum amplitude, and if said amplitude is higher than the minimum amplitude, then the predetermined movement is detected and the door is opened, otherwise if, in said interval of interest, the second radar also sees the predetermined number of changes of phase between the in-phase component and the phase-offset component, then, the predetermined movement is detected and the door is opened.

Otherwise, the door is not opened.

Advantageously, the characteristic parameter of the in-phase or phase-offset components is an amplitude or a frequency.

Preferably, the phase-offset component is a quadrature component, offset by an angle of 90° with respect to the in-phase component.

Judiciously, the characteristic value of a peak is persistence of the peak.

However, the characteristic value of a peak may also be an amplitude of the peak, or an integral of the values of the peak in the time between a minimum value of the peak and a maximum value of the peak.

When the predetermined movement is a forth-and-back movement of a part of the body of the user toward and away from the detecting device, then the predetermined number of changes of phase is equal to one and the predetermined number of peaks is equal to two.

The invention also relates to a device for detecting a predetermined movement of a part of the body of a user, able to be carried on board a motor vehicle, said device being noteworthy in that it comprises two Doppler radars, a first radar being able to emit waves oriented toward the rear of the vehicle, and a second radar being able to emit waves oriented toward the ground, each radar comprising an antenna, means for transmitting and receiving radar waves, and means for processing the reflected radar waves and able to detect the predetermined movement, the processing means comprising:

means for extracting at least one physical parameter of the in-phase component or of the phase-offset component, first means for comparing, in an interval of interest, the physical parameter with a predetermined shape comprising a predetermined number of peaks a characteristic value of which is higher than a threshold, first means for verifying a synchronization of the predetermined shapes between the two radars, and, for the first radar only:

second means for verifying, in said interval of interest, the presence of a predetermined number of changes of phase between the in-phase component and the phase-offset component, means for unlocking doors depending on the results of the above comparisons and verification.

In the second embodiment, the detecting device further comprises:

for the second radar, second means for comparing an amplitude of the in-phase component or phase-offset component with a minimum amplitude, for the second radar, third means for verifying, in said interval of interest, whether a predetermined number of changes of phase between the in-phase component and the phase-offset component is present, means for unlocking doors depending on the results of the above comparison and verification.

Advantageously, the characteristic parameter of the in-phase or phase-offset components is an amplitude or a frequency.

Judiciously, the phase-offset component is a quadrature component, offset by an angle of 90° with respect to the in-phase component.

Preferably, the characteristic value of a peak is persistence of the peak.

However, the characteristic value of a peak is an amplitude of the peak, or an integral of the values of the peak in the time between a minimum value of the peak and a maximum value of the peak.

When the predetermined movement is a forth-and-back movement of a part of the body of the user toward and away from the detecting device, the predetermined number of changes of phase is equal to one and the predetermined number of peaks is equal to two.

The invention also applies to any motor vehicle comprising a detecting device according to any one of the features enumerated above.

BRIEF DESCRIPTION OF THE DRAWINGS

Other features and advantages of the invention will become more clearly apparent on reading the following description. This description is purely illustrative and must be read with reference to the appended drawings, in which:

FIG. 1 schematically shows a vehicle equipped with a device for detecting a predetermined movement of a part of the body of a user, comprising two Doppler radars, according to the invention, FIG. 2 schematically shows a first radar of the detecting device, and its electronic components, according to the invention, FIG. 3 schematically shows means for transmitting and receiving radar waves, these means being connected to a first antenna A1, and further comprising in-phase and phase-offset demodulating means, according to the invention, FIG. 4 shows the in-phase component I representing a phase variation of the reflected waves, and the quadrature component Q representing an offset phase variation of the reflected waves, as a function of time t, FIG. 5 is a flowchart showing the various steps of the method for opening doors according to the invention, FIG. 6 contains eight graphs—on the right, four graphs relating to the signals received by the first radar R1: a first graph illustrating the raw signals of the Doppler radar of the in-phase component I1 and of the phase-offset component Q1, a second graph showing the amplitude of the in-phase component I1, a third graph showing the frequency F1 of the in-phase component, and a fourth graph showing a change of phase φ1 between the in-phase component I1 and the phase-offset component Q1; and—on the left, four graphs relating to the signals received by the second radar R2: a first graph illustrating the raw signals of the Doppler radar of the in-phase component I2 and of the phase-offset component Q2, a second graph showing the amplitude of the in-phase component I2, a third graph showing the frequency F2 of the in-phase component, and a fourth graph showing a change of phase φ2 between the in-phase component I2 and the phase-offset component Q2, during performance, by the user, of a predetermined movement intended to unlock the trunk of his vehicle, FIG. 7 contains eight graphs—on the right, four graphs relating to the signals received by the first radar R1: a first graph illustrating the raw signals of the Doppler radar of the in-phase component I1' and of the phase-offset component Q1', a second graph showing the amplitude of the in-phase component I1', a third graph showing the frequency F1' of the in-phase component, and a fourth graph showing a change of phase φ1' between the in-phase component I1' and the phase-offset component Q1'; and—on the left, four graphs relating to the signals received by the second radar R2: a first graph illustrating the raw signals of the Doppler radar of the in-phase component I2' and of the phase-offset component Q2', a second graph showing the amplitude of the in-phase component I2', a third graph showing the frequency F2' of the in-phase component, and a fourth graph showing a change of phase φ2' between the in-phase component I2' and the phase-offset component Q2', during performance, by the user, of a parasitic movement not intended to unlock the trunk of his vehicle, FIG. 8 schematically shows the persistence value computed for five frequency peaks of the frequency signal of the first radar.

DESCRIPTION OF THE PREFERRED EMBODIMENTS

FIG. 1 shows a motor vehicle V, equipped with a device D for detecting a predetermined movement of a part of the body of a user, according to the invention and intended to trigger opening of a door, in the present case, in this example, the lid of the trunk of the vehicle V. Said detecting device D is able to be carried on board a motor vehicle, and is comprised, preferably, but in no way limitingly, in the rear bumper of the vehicle V. More particularly, said device comprises two Doppler radars R1, R2, each comprising an antenna A1, means for transmitting and receiving radar waves via said antenna A1 and means for processing the reflected radar waves in order to detect the predetermined movement. A first radar R1 is able to emit radar waves oriented toward behind the vehicle. A second radar R2 is able to emit radar waves oriented toward below the vehicle, and more precisely toward the ground. The two radars R1, R2 are integrated for example in the bumper of the vehicle V.

The predetermined movement may consist of a "kick" or a forth/back movement of the lower leg of a user directed toward/away from the two radars, in the present case, in this example, toward/away from the bumper of the vehicle V. However, the present invention applies to any predetermined movement.

It is known in the prior art to process radar waves transmitted by a single radar and reflected by the presence of the body of the user, to determine whether said user has made the predetermined movement and therefore whether he wishes to open the trunk of his vehicle. If the predetermined movement is detected, then opening of the trunk is triggered—this is known to those skilled in the art and will not be detailed here. The drawback of a Doppler radar, as explained above, is the lack of reliability and robustness of the detection.

FIG. 2 shows the first radar R1, which comprises a first antenna A1 connected to transmitting and receiving means 10, themselves connected to a control unit 20. The transmitting/receiving means 10 are supplied with a voltage Vcc, directly or indirectly from the voltage of the battery of the vehicle V. Switching means S1 allow the transmitting/receiving means 10 to be powered. The second radar R2 (not illustrated) comprises the same components as the first radar R1.

According to the invention, as illustrated in FIG. 3, the transmitting and receiving means 10 further comprise a directional coupler 101 connected to the first antenna A1, and two demodulators connected to an output of the directional coupler: a first demodulator 102 able to deliver as output an in-phase component I1 representing the phase variations of the reflected waves received by the first antenna A1, and a second demodulator 103 able to deliver as output a phase-offset component Q1 representing the offset phase variations of the reflected waves received by the first antenna A1. To this end, a phase shifter 104 is connected to the second demodulator 103. The directional coupler 101 allows the transmitting/receiving means 10 to operate in transmission and in reception simultaneously and allows the transmission signal to be separated from the reception signal, i.e. the transmitted radar wave to be separated from the received radar wave. An output of the first demodulator 102 and an output of the phase shifter 104 are connected to an input of the directional coupler 101, and to an oscillator 105, which generates the transmission signal intended for the first antenna A1. The second radar R2 (not shown) similarly comprises a directional coupler, a first demodulator, a second demodulator, a phase shifter, and an oscillator.

When radar waves are reflected by the presence of the body of the user and received by the first antenna A1, via the directional coupler, the signal of the reflected waves is transmitted to the first demodulator 102, which generates an in-phase component I1 representative of the phase of the waves. The in-phase component I1 is shown as a function of time in the graph illustrated in FIG. 4. The in-phase component I1 is a signal of sinusoidal shape.

The signal of the reflected waves is also transmitted to the second demodulator 103, which for its part generates a phase-offset component Q1 representative of an offset phase of the waves—more precisely, the phase-offset component Q1 is an image of the in-phase component I1 shifted in time t. Preferably, but in no way limitingly, the phase offset is an angular offset of 90° in value. The phase-offset component is then called the quadrature component Q1, and is shown as a function of time t in the graph illustrated in FIG. 4—the quadrature component Q1 is therefore also a signal of sinusoidal shape.

The signals representative of the in-phase components I1 and of the quadrature component Q1 are then delivered to the control unit 20, which analyzes said signals. The control unit 20 also comprises, for each radar, i.e. for the first and second radars R1, R2, respectively:
- means M1 for extracting at least one physical parameter, for example either the amplitude A1 (A2, respectively) or the frequency F1 (F2, respectively) of the in-phase component I1 (I2) or of the phase-offset component Q1 (Q2),
- first means M2 for comparing, in an interval of interest Δt, the physical parameter A1 (A2), F1 (F2) with a predetermined shape comprising a predetermined number of peaks a characteristic value of which, the persistence Per for example, is higher than a threshold,
- first means M3 for verifying a synchronization of the predetermined shapes between the two radars R1, R2, and, for the first radar R1 only:
- second means M4 for verifying, in said interval of interest Δt, the presence of a predetermined number of changes of phase between the in-phase component I1 and the phase-offset component Q1,
- means M5 for unlocking doors depending on the results of the above comparison(s) and verification(s).

The extracting means M1, the first comparing means M2, the first and second verifying means M3, M4 and the unlocking means M5 are partially or completely software means that may be comprised in a microcontroller.

In a second embodiment of the invention, the control unit 20 further comprises, for reflected and received waves, for the second radar R2 only:
- second means M6 for comparing an amplitude A2 of the in-phase component I2 or phase-offset component Q2 with a predetermined amplitude,
- for the second radar R2, third means M7 for verifying, in said interval of interest Δt, whether a predetermined number of changes of phase between the in-phase component I2 and the phase-offset component Q2 is present,
- means M8 for unlocking doors depending on the results of the above comparison and verification.

The phase offset is preferably but in no way limitingly an angular offset, of 90° (or π/2) in value, between the in-phase component I1 (I2) and the quadrature component Q1 (Q2). However, any other angular-offset value between 0° and 180° may be envisioned.

Preferably, and as described below, the predetermined number of changes of phase is equal to one.

The method for opening doors of the vehicle, according to the invention, is illustrated in FIG. 5 and will now be described.

In a first embodiment of the method according to the invention, the first step E1 consists in measuring, for each radar R1, R2, the in-phase component I1, I2 and the quadrature component Q1, Q2 of the reflected radar waves, continuously at a set frequency, and in extracting therefrom, at least for one of the two components, a characteristic parameter such as:
- an amplitude A1, A2, or
- a frequency F1, F2, and the phase difference between the two components, i.e. a phase difference φ1, φ2 between the in-phase component I1 (I2, respectively) and the quadrature component Q1 (Q2, respectively). For the sake of clarity, in the remainder of the text the characteristic parameter used in the opening method according to the invention will be considered to be the frequency F1 (F2, respectively) of the in-phase component I1 (I2, respectively), though it could also be a question of the amplitude A1 (A2, respectively), and/or of the phase-offset component Q1 (Q2, respectively).

Next, in a second step E2, for each radar R1, R2, the characteristic parameter, i.e. the frequency F1 (F2) of the in-phase component I1 (I2), is compared with predetermined thresholds—at least one threshold, and preferably two: a high threshold and a low threshold. The aim of this step is to verify, for each of the two radars R1, R2, that the characteristic parameter F1 (F2) of the in-phase component I1 (I2) follows a predetermined shape. This predetermined shape preferably resembles a succession of two peaks, or double "bell curve". This is illustrated in FIG. 6. In FIG. 6, in the case of a predetermined movement, the third graph starting from the top, on the left, illustrates the characteristic parameter (in the present case the frequency F1) of the in-phase component I1 of the first radar R1; and the third graph starting from the top, on the right, illustrates the characteristic parameter (in the present case the frequency F2) of the in-phase component I2 of the second radar R2. These frequencies F1, F2 each comprise two successive peaks. In FIG. 6, two thresholds S and S' are illustrated; the thresholds may be different between the characteristic parameters of the two radars R1, R2.

For each radar R1, R2, if the representative parameter (here the frequency F1, F2) of the in-phase component I1, I2 follows the predetermined shape, in the present case if it crosses the first and second thresholds S, S'— (higher than the first threshold S and second threshold S' then consecutively lower than the second threshold S' then higher than the $2^{nd}$ threshold and lastly lower than the first and second predetermined thresholds S, S'), then it is verified, in the following step E3, that the times at which said upper and lower thresholds are crossed, for the two radars R1, R2, are comprised in the same predetermined time window or in the same time interval Δt. The aim is, in step E3, to verify that the times at which the upper and lower thresholds are crossed are substantially synchronized between the two radars R1, R2. In the third graph on the left in FIG. 6, t1 corresponds to the first time at which the first threshold S is crossed by the frequency F1, this corresponding to the start of the predetermined shape, and t2 corresponds to the last time at which the frequency F1 passes below the first threshold S, this corresponding to the end of the predetermined shape. The interval Δt between the first time t1 and the last time t2 will be referred to as the interval of interest. By "synchronized", what is meant is the fact that, for the two radars R1, R2, the predetermined shapes lie in said interval of interest Δt (to which of course a margin of error may be added). This is illustrated in FIG. 6, in the third graph on the right in FIG. 6: the times at which the upper and lower thresholds are crossed are located in the same interval of interest Δt.

Otherwise, if the times at which the thresholds of the representative parameter of each radar R1, R2 are crossed are not comprised in the same interval of interest Δt—in other words if the frequencies F1, F2 of the in-phase components of the two radars R1, R2 do not have synchronized predetermined shapes—then the method returns to the first step E1.

If the predetermined shapes of the representative parameter F1, F2 are synchronized between the two radars R1, R2, then, in the following step (step E4), in said interval of interest Δt, a number of peaks present is counted and a characteristic value is furthermore computed for each peak.

A characteristic value is preferably, but in no way limitingly, a persistence Per of the peak. How to compute the persistence Per of a peak is known to those skilled in the art, and may be found in the scientific literature (http://www2.iap.fr/users/sousbie/web/html/indexd3dd.html?post/Persistence-and-simplification, http://www.astro.rug.nl/~weygaert/tim1publication/jigsaw/cohensteiner_jigsaw.pdf, https://geometrica.saclay.inria.fr/team/Steve.Oudot/courses/EMA/Slides_intro.pdf, https://www.sthu.org/blog/13-persdopology-peakdetection/index.htm). The persistence of some peaks is illustrated in FIG. 8. FIG. 8 shows a predetermined shape of the frequency F1 of the in-phase component I1 of the first radar R1 in the interval of interest Δt. Furthermore, five computations of persistence Per for five peaks, P1, P2, P3, P4 and P5, have been illustrated. The persistence of the first peak P1 is equal to 81, the persistence of the second peak P2 is equal to 0.28, that of the third peak P3 is equal to 51, that of the fourth peak P4 is equal to 8, and lastly that of the fifth peak P5 is equal to 0.61. The two peaks with the highest persistence Per are the first peak P1 and the third peak P3.

The characteristic value may also be an amplitude of the peak, or an integral with respect to time of the values comprised between a minimum value of the peak and a maximum value of the peak, or any other computation allowing the relative importance of a peak of the representative parameter with respect to other peaks present in the interval of interest Δt to be evaluated.

Once the number of peaks present in the time interval has been determined and characterized by, for example, their persistence Per, it is verified, in step E5, for each radar R1, R2, that the number of peaks of the representative parameter F1, F2 having a persistence above a predetermined persistence threshold is strictly lower than a predetermined number Nb, 3 for example. The aim of this step E5 is to filter out any event that may create multiple reflected waves, generating many peaks of high persistence Per, such as for example an individual passing near the vehicle or the user operating on his automobile but not wishing to unlock the trunk of his vehicle V.

If in the interval of interest Δt the number of peaks having a persistence Per above a predetermined persistence threshold is strictly lower than 3 (step E5), then in the next step (step E6) the presence, in the waves reflected and received by the first radar R1 only, in the present case the radar transmitting waves oriented toward behind the vehicle, of a predetermined number of changes of phase φ1 between the in-phase component I1 and the quadrature component Q1 is verified. Preferably, the predetermined number is equal to one. This is illustrated in FIG. 6, which illustrates, during the performance of the predetermined movement, in the fourth graph located at the bottom left of FIG. 6, one and only one change of phase between the in-phase component I and the quadrature component Q, which change of phase is represented by a rising edge stretching from the value +1 to the value −1. In the case where the component Q1 is a quadrature component, the change of phase φ1 may take the value −90° or +90°. In the fourth graph on the left in FIG. 6, the change of phase has been normalized to −1 or +1. The change of phase may therefore be either a rising edge from −1 to +1, or a falling edge from +1 to −1, depending on the direction of the phase-shift computation and the chosen normalization.

If the waves received by the first radar R1 contain the predetermined number of changes of phase φ1 (step E6), in the present case, in our example, one and only one change of phase, during the interval of interest Δt, then the predetermined movement is detected and unlocking of the trunk is actuated; otherwise, the predetermined movement is not detected and the trunk remains locked.

In one preferred embodiment, it is proposed, after step E6, to verify the presence of atypical but valid predetermined movements, in the present case a movement due to a slid foot, and to distinguish such a movement from that of a "walker", i.e. the movement of an individual walking near the bumper but not making the predetermined movement, and hence a movement not intended to unlock the trunk of the vehicle V.

To this end, following detection of the predetermined number of changes of phase φ1 in the reflected waves received by the first radar R1, provision is made for additional steps, which have been represented by dashed lines in the flowchart of FIG. 5.

It is thus verified in step E7 that, during said interval of interest Δt, the amplitude A2 of at least one of the two components, for example the amplitude of the in-phase component I2 (or of the phase-offset component Q2), of the waves received by the second radar R2 is higher than a minimum amplitude Amin (see second graph on the right in FIG. 6).

If the amplitude A2 of one of the components of the waves received by the second radar R2 is above a predetermined amplitude Amin, then a predetermined but atypical movement is detected, and unlocking is actuated.

If the amplitude A2, for example of the in-phase component I2 of the second radar R2, is lower than a predetermined amplitude during said interval of interest Δt, then it is verified, in step E8, whether the waves received by the second radar R2 contain the predetermined number of changes of phase φ2 during said interval of interest Δt (in the present case, in this example, one and only one change of phase).

If the waves received by the second radar R2 contain a single change of phase φ2 during said interval of interest Δt, then an atypical but valid predetermined movement is detected and unlocking is actuated; otherwise, no atypical predetermined movement is detected and the trunk remains locked.

This preferred embodiment allows a movement of the type due to a foot being slid over the ground to be recognized and above all prevents the movement due, for example, to a walker, i.e. to an individual walking beside the detecting device but not making the predetermined movement, from being considered to be a predetermined movement.

Thus ingeniously, in the first embodiment, unlocking occurs only on the detection of an event detected synchronously by both radars and then on analysis of the signals generated by the first radar R1.

The second embodiment is an improvement that is based on analysis of signals coming from both radars R1, R2, in order to reject movements of walker type that would be detected as valid by the first embodiment.

FIG. 7 illustrates, for waves received by the first and second radars R1 (graphs located on the left in FIG. 6) and R2 (graphs located on the right in FIG. 6), and as a function of time, the signals of the in-phase components I1', I2' and phase-offset components Q1', Q2', the amplitude A1', A2' and frequency F1', F2' of the in-phase component I1', I2', and the change of phase φ1', φ2', during a parasitic event due to the user and that is not a predetermined movement. The frequency F1' has a predetermined shape during the interval of interest Δt' (taking the form of two main peaks) but the frequency F2' does not have the predetermined shape during the same interval of interest Δt'. Therefore the movement is not a predetermined movement, according to the example described and explained above.

The invention is therefore ingenious insofar as it mitigates the drawbacks of the prior art: the method for opening doors according to the invention allows a reliable and robust detection to be achieved by judiciously and non-redundantly using the signals generated by two Doppler radars that are placed in a particular way on the vehicle V in order to avoid redundancy in the measurements.

The invention claimed is:

1. A method for opening a door of a motor vehicle equipped with a device configured to detect a predetermined movement of a part of the body of a user, the method comprising:
   equipping the device beforehand with two Doppler radars including a first radar configured to emit waves oriented toward behind the vehicle, and a second radar configured to emit waves oriented toward the ground, each of the Doppler radars comprising an antenna, a device configured to transmit and receive radar waves, and a processor configured to process the reflected radar waves and to detect the predetermined movement;
   measuring at set frequency, for each of the Doppler radars, an in-phase component and a phase-offset component of the reflected waves;
   determining a characteristic parameter of at least one of the two components for each of the Doppler radars;
   comparing, for each of the Doppler radars, the characteristic parameter with a predetermined shape comprising a predetermined number of peaks a characteristic value of which is higher than a predetermined persistence threshold; and
   when the characteristic parameter has, for the first and second radars, the predetermined shape in a specific interval of interest and when, in said specific interval of interest, the first radar sees a predetermined number of changes of phase between the in-phase component and the phase-offset component, then, detecting the predetermined movement and opening the door, and
   when the characteristic parameter does not have, for the first and second radars, the predetermined shape in the specific interval of interest or the first radar does not see the predetermined number of changes of phase between the in-phase component and the phase-offset component in the specific interval of interest, not opening the door.

2. The method for opening the door as claimed in claim 1, wherein,
   when the first radar sees the predetermined number of changes of phase between the in-phase component and the phase-offset component, the method further comprises:
      comparing, in said specific interval of interest, an amplitude of one of the two components of the second radar with a minimum amplitude, and
      when said amplitude is higher than the minimum amplitude, then detecting the predetermined movement and opening the door, and
      when the amplitude is not higher than the minimum amplitude,
      when, in said interval of interest, the second radar also sees the predetermined number of changes of phase between the in-phase component and the phase-offset component, then detecting the predetermined movement and opening the door, and
      when the second radar does not also see the predetermined number of changes of phase, not opening the door.

3. The method for opening the door as claimed in claim 2, wherein the characteristic parameter of the in-phase components or the phase-offset components is an amplitude or a frequency.

4. The method for opening the door as claimed in claim 2, wherein the phase-offset component is a quadrature component, offset by an angle of 90° with respect to the in-phase component.

5. The method for opening the door as claimed in claim 2, wherein the characteristic value of a peak is a persistence of the peak.

6. The method for opening the door as claimed in claim 1, wherein the characteristic parameter of the in-phase components or the phase-offset components is an amplitude or a frequency.

7. The method for opening the door as claimed in claim 6, wherein the phase-offset component is a quadrature component, offset by an angle of 90° with respect to the in-phase component.

8. The method for opening the door as claimed in claim 6, wherein the characteristic value of a peak is a persistence of the peak.

9. The method for opening the door as claimed in claim 1, wherein the phase-offset component is a quadrature component, offset by an angle of 90° with respect to the in-phase component.

10. The method for opening the door as claimed in claim 1, wherein the characteristic value of a peak is a persistence of the peak.

11. The method for opening the door as claimed in claim 1, wherein the characteristic value of a peak is an amplitude of the peak, or an integral of the values of the peak in the time between a minimum value of the peak and a maximum value of the peak.

12. The method for opening a door as claimed in claim 1, wherein the predetermined movement is a forth-and-back movement of a part of the body of the user toward and away from the detecting device, the predetermined number of changes of phase being equal to one and the predetermined number of peaks being equal to two.

13. A device for detecting a predetermined movement of a part of the body of a user, the device being configured to be carried on board a motor vehicle, said device comprising:
   two Doppler radars including a first radar configured to emit waves oriented toward behind the vehicle, and a second radar configured to emit waves oriented toward the ground, each of the Doppler radars comprising an antenna, a device configured to transmit and receive radar waves, and a processor configured to process the reflected radar waves and to detect the predetermined movement, the processor being configured to:
   extract at least one physical parameter of an in-phase component or a phase-offset component,
   compare, in an interval of interest, a physical parameter with a predetermined shape comprising a predetermined number of peaks a characteristic value of which is higher than a threshold, and
   verify a synchronization of the predetermined shapes between the two radars, and
   for the first radar only:

verify, in said interval of interest, the presence of a predetermined number of changes of phase between the in-phase component and the phase-offset component, and unlock the door depending on results of the comparing, the verifying the synchronization, and the verifying the interval of interest.

14. The detecting device as claimed in claim 13, further comprising:

for the second radar, one or more processors configured to:

compare an amplitude of the in-phase component or phase-offset component with a minimum amplitude, verify, in said specific interval of interest, whether the predetermined number of changes of phase between the in-phase component and the phase-offset component is present, and unlock the door depending on results of the comparing and verifying.

15. The detecting device as claimed in claim 14, wherein the characteristic parameter of the in-phase component or the phase-offset component is an amplitude or a frequency.

16. The detecting device as claimed in claim 15, wherein the characteristic value of a peak is an amplitude of the peak, or an integral of the values of the peak in the time between a minimum value of the peak and a maximum value of the peak.

17. A motor vehicle, comprising:

the detecting device as claimed in claim 15.

18. The detecting device as claimed in claim 13, wherein the phase-offset component is a quadrature component, offset by an angle of 90° with respect to the in-phase component.

19. The detecting device as claimed in claim 13, wherein the characteristic value of a peak is a persistence of the peak.

20. The detecting device as claimed in claim 13, wherein the predetermined movement is a forth-and-back movement of a part of the body of the user toward and away from the detecting device, the predetermined number of changes of phase being equal to one and the predetermined number of peaks being equal to two.

* * * * *